United States Patent [19]
Lövdahl

[11] Patent Number: 6,033,028
[45] Date of Patent: Mar. 7, 2000

[54] ATTACHMENT DEVICE AND A VEHICLE SEAT INCLUDING SUCH A DEVICE

[75] Inventor: Torbjörn Lövdahl, Grimslöv, Sweden

[73] Assignee: Hammarverken i Vaxjo AB, Sweden

[21] Appl. No.: 09/029,527

[22] PCT Filed: Aug. 29, 1996

[86] PCT No.: PCT/SE96/01062

§ 371 Date: Jun. 9, 1998

§ 102(e) Date: Jun. 9, 1998

[87] PCT Pub. No.: WO97/08010

PCT Pub. Date: Mar. 6, 1997

[30] Foreign Application Priority Data

Aug. 30, 1995 [SE] Sweden ................................ 9502987

[51] Int. Cl.⁷ ...................................................... B60N 2/44
[52] U.S. Cl. ..................................... 297/463.1; 248/503.1; 411/15
[58] Field of Search ............................... 248/188.4, 503.1; 411/15; 297/463.1, 463.2, 344.1; 296/63

[56] References Cited

U.S. PATENT DOCUMENTS 1,137,443  4/1915  Ackerman .
2,365,372  12/1944  Allen .
4,218,954  8/1980  Morel .
5,246,322  9/1993  Salice .

FOREIGN PATENT DOCUMENTS 2 545 767  11/1984  France .
2 571 794  4/1986  France .
89/09707  10/1989  WIPO .

*Primary Examiner*—Milton Nelson, Jr.
*Attorney, Agent, or Firm*—Lerner, David, Littenberg, Krumholz & Mentlik, LLP

[57] ABSTRACT

Fastening devices are disclosed for joining a pair of objects displaced from each other, the fastening device including a sleeve affixed to the first object, a spacer movably disposed within the sleeve and adapted to abut against the second object, an expansion plate adapted to bear against the spacer within the sleeve and a fastening screw for interacting with an aperture in the second object such that when the fastening screw is tightened the expansion plate is pressed against the spacer and is thereby expanded to lock against the sleeve.

7 Claims, 2 Drawing Sheets

ATTACHMENT DEVICE AND A VEHICLE SEAT INCLUDING SUCH A DEVICE

FIELD OF THE INVENTION

The present invention relates to a fastening device.

BACKGROUND OF THE INVENTION

When assembling displaceable seats in vehicles, a system is often utilized which is composed of three parts: a floor attachment, a runner and the seat itself which includes the seat back. The runner is attached to the seat and is displaceably mounted on the floor attachment. The floor attachment is screwed to the floor at four different fastening points, two at the front and two at the back.

A problem in connection with the above-described assembly is that vertical play normally arises between one of the fastening points and the floor. If four fastening points are utilized for the attachment, play therefore arises at the fourth fastening point after the first three fastening points have been secured with screws. When mounting the floor attachment, the fastening procedure therefor has to be adjusted in order to compensate for variations in the vertical direction which arise at the fourth fastening point. This is normally accomplished by means of the mounting holes of the fastening points, in the rear, having a diameter which is larger than the diameter of the fastening screws which are utilized. This permits a certain degree of lateral displacement of the floor attachment. This type of fastening is, however, not possible in the case where all of the fastening surfaces are arranged horizontally, i.e. if they are parallel to the seat of the vehicle.

An object of the present invention is therefore to solve the above mentioned problem and to provide a fastening device for the fastening of a first and a second object which are separated from each other by a certain distance in space. The above mentioned objects preferably comprise fastening surfaces which are essentially arranged parallel to each other.

SUMMARY OF THE INVENTION

In accordance with the present invention, this and other objects have now been realized by the discovery of a fastening device for joining a first object to a second object including an aperture at a predetermined distance from each other, the fastening device comprising a sleeve member adapted to be firmly affixed to the first object, a distance member movably disposed within the sleeve member whereby the distance member is adapted to abut against the second object, an expansion member adapted to bear against the distance member within the sleeve member, and a fastening screw for interacting with the aperture in the second object whereby when the fastening screw is tightened the expansion member is pressed against the distance member and is thereby expanded to lock against the sleeve member. In a preferred embodiment, the sleeve member has an inner dimension and includes a bottom surface defining an aperture having an inner dimension, and the distance member comprises a flange having an outer dimension, the outer dimension of the flange being greater than the inner dimension of the aperture in the bottom surface of the sleeve member and less than the inner dimension of the sleeve member. In a preferred embodiment, the expansion member bears against the flange.

In accordance with one embodiment of the fastening device of the present invention, the fastening device includes a planar washer disposed between the fastening screw and the expansion member.

In accordance with another embodiment of the fastening device of the present invention, the expansion member has a circumference and comprises a plurality of radial tongues extending towards the circumference, the plurality of radial tongues being curved in relation to the plane of the expansion member.

In accordance with another embodiment of the fastening device of the present invention, the fastening device includes a transport securing device fixed on the distance member and interacting with the fastening screw.

In accordance with the present invention a vehicle seat is also provided comprising a fastening device as set forth above.

The fastening device according to the present invention comprises a sleeve member which is preferably designed as a cup with a bottom hole, a distance member, a fastening screw, a planar washer and an expansion member. The sleeve member is attached to the first object, which preferably constitutes a floor attachment for a vehicle seat. The distance member bears against or is attached to the second object which preferably constitutes the floor of the vehicle. The outer dimensions of the distance member are smaller than the inner dimensions of the sleeve member so that the distance member is telescopically displaceable within the sleeve member. The expansion member bears against the distance member and is braced with the aid of a fastening screw which extends through the sleeve member and the distance member and which interacts with a hole in the second object. When the fastening screw is screwed into its fastening hole, the expansion member will be compressed, whereby it presses against the inner wall of the sleeve member. The friction between the expansion member and the sleeve member is sufficient to achieve a joint. The distance member has a predetermined length depending on the vertical play which must be accommodated thereby.

With a construction according to the present invention, a self-adjusting fastening device is attained which can compensate for vertical differences between the fastening points. No special adjustment is necessary, but instead trimming of the entire floor attachment takes place automatically during the assembly thereof.

The present invention may be utilized as a mounting console for two objects which may be arranged at an arbitrary angle in relation to each other, provided that their fastening surfaces are essentially parallel to each other.

According to a particular embodiment of the present invention, the sleeve member comprises a bottom surface with a hole. Furthermore, the distance member comprises a flange, the outer dimensions of which are larger than the inner dimensions of the hole but smaller than the inner dimensions of the sleeve portion. This provides the advantage that the distance member is prevented from being pressed out through the bottom hole in the sleeve member.

BRIEF DESCRIPTION OF THE DRAWINGS

The present invention will be more fully appreciated with reference to the following detailed description, with reference to the attached drawings, in which.

DETAILED DESCRIPTION

Figure 1:
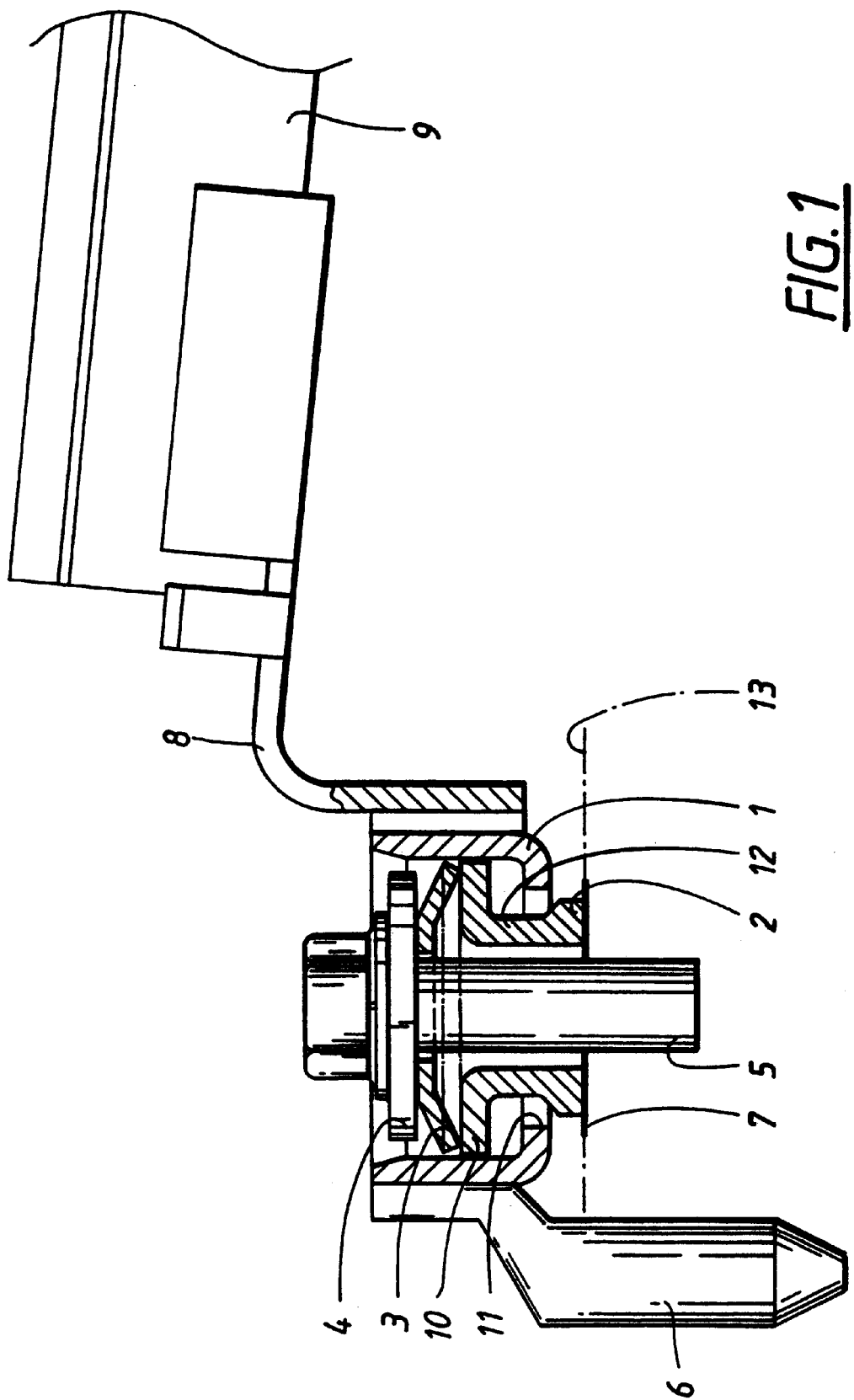
FIG. 1 is a side, elevational, partly sectional view of a front attachment for a rail, which is part of the floor attachment of a vehicle seat, and a fastening device according to the present invention.

In FIG. 1 a fastening device is shown for a rail 9 which is part of the floor attachment of a (not shown) vehicle seat. On the front end of the rail 9 there is located an attachment 8 which is firmly joined to an essentially sleeve-shaped member which, according to a preferred embodiment, constitutes a cup 1. On the cup 1 there is also disposed a guide pin 6 which fits into a corresponding hole in the floor of the vehicle, which is indicated by a broken line 13.

A distance member 2 having a flange 10 at one end and a lower portion 12 which abuts the floor 13 is disposed in the cup 1. The distance member 2 is positioned in a manner such that the lower portion 12 protrudes through a bottom hole 11 in the cup 1, whereby the flange 10 remains within the cup 1. The outer dimensions of the flange 10 are somewhat smaller than the inner dimension of the cup 1. The dimensions of the bottom hole 11 are smaller than the inner dimension of the cup 1 and somewhat larger than the dimensions of the lower portion 12 of the distance member 2, but smaller than the dimensions of the flange 10. Furthermore, the is distance member 2 is preferably arranged to be telescopically movable inside the cup 1.

In the vehicle floor 13 there is also a (not shown) hole for a fastening screw 5 which is intended to press an expansion member 3 against the flange 10. A planar washer 4 is arranged between the head of the fastening screw 5 and the expansion member 3. The plane of the expansion member 3 is essentially perpendicular to the axial direction of the fastening screw 5, i.e. the expansion member 3 defines a surface which is essentially parallel to the vehicle floor 13. When the fastening screw 5 is tightened, the expansion member 3 is squeezed between the planar washer 4 and the flange 10. When the tightening of the fastening screw 5 is completed, the expansion member 3 is pressed against the inside of the cup 1 so that the friction provides a solid joint between the fastening screw 5 and the cup 1.

Figure 2:
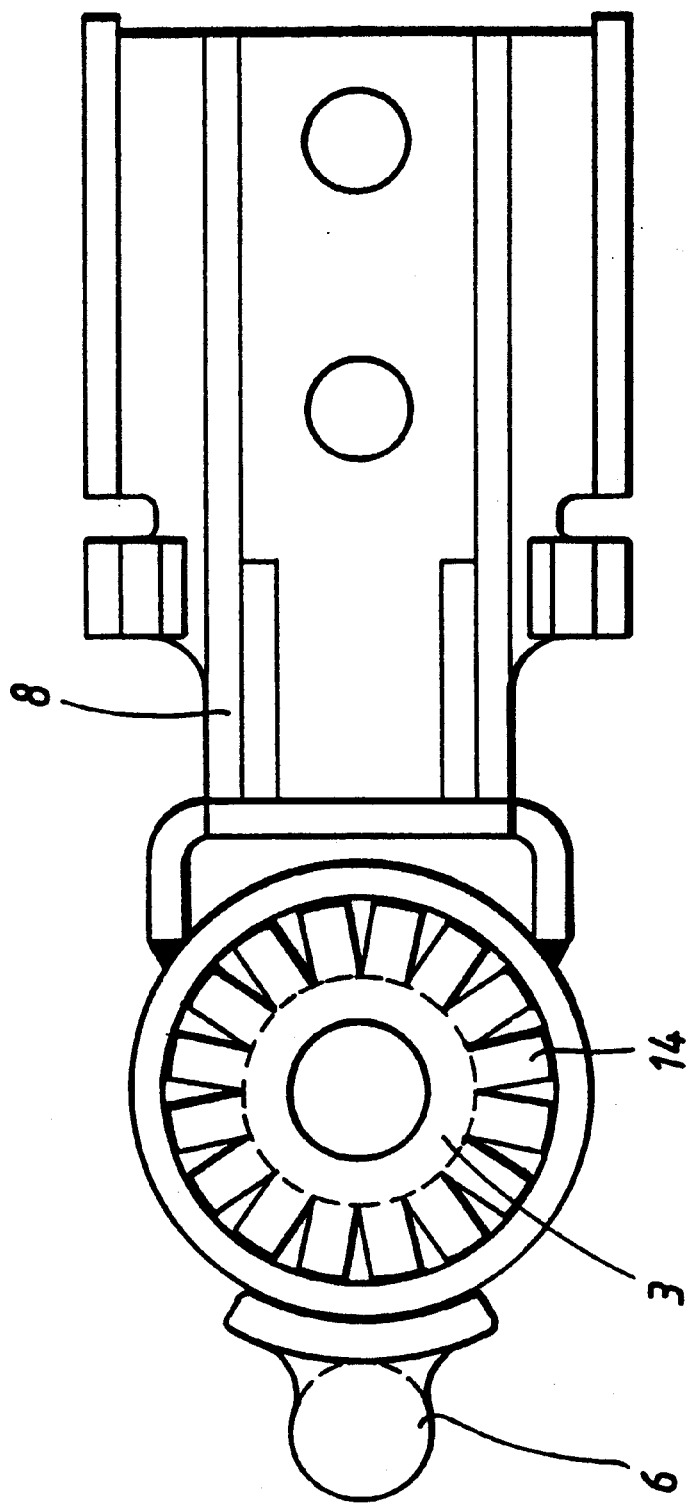
FIG. 2 is a top, elevational view of the fastening device shown in FIG. 1.

As can be readily seen from FIG. 2, the expansion member 3 is essentially annular and comprises a plurality of radial tongues 14, extending towards the circumference of the expansion member 3. The tongues 14 are curved, preferably downwards, in relation to the plane of the expansion member 3. When tightening the fastening screw 5, the tongues 14 are bent backwards into a position parallel to that plane, whereby the outer dimension of the expansion member 3 is increased. Because of the friction between the expansion member 3 and the inner wall of the cup 1, the expansion member 3 is secured.

The expansion member 3 is dimensioned with normal use of a vehicle seat in mind. Possible collision forces are absorbed by the cup 1. The number of tongues 14 and the material is adapted to the expected stresses.

It is most advantageous to manufacture the expansion member 3 out of spring steel, which ensures that it retains its elasticity and makes it possible to reuse is after undoing the joint. The distance member 2 also locks the movement upwards of the cup 1 in case of increased stresses on the joint.

The fastening device according to the present invention is preferably used as one of four attachments in a floor attachment for a vehicle seat. The two rear and one of the front attachments constitute attachments of a known type, for instance common holes in the assembly plate. The second front attachment is designed according to the present invention. When mounting a vehicle seat, fastening screws of a known type are screwed into the three attachments. The floor attachment will then adapt a certain position in relation to the vehicle floor. This position may vary in the vertical direction, and cause a certain amount of play between the cup 1 and the vehicle floor 13. This play is taken up by the lower portion 12 of the distance member 2. In this position, the fastening screw 5 may be tightened without the need for any manual adjustment of the position of the fastening device in relation to the floor. The distance member 2 slides on the inner surface of the cup 1 until the distance member 2 reaches the vehicle floor 13, whereby the expansion member 3 is compressed until it is locked against the inner surface of the cup 1.

The flange 10 limits the upward movement of the cup 1 when a stress occurs which is larger than the frictional force between the expansion member 3 and the cup 1.

The fastening device according to the present invention enables an automatic adjustment of fastening devices and contains a small number of parts, which is advantageous from the viewpoint of manufacturing and spare parts. Smaller angular differences may also be compensated for by means of the expansion washer, i.e. if the angle between the floor 13 and the fastening screw 5 is not exactly 90 degrees.

A transport securing device 7 is also shown in FIG. 1. This is used in order to keep the pre-mounted fastening device together during transportation. The transport securing device 7 may, for instance, constitute a plastic plate attached to the distance sleeve 2 and the fastening screw 5.

Another use of fastening members according to the present invention is to solely utilize this type of fastening member for adjustable fastening in space. The object which is to be fastened, for instance on a wall, is furnished with one or several fastening devices according to the present invention (e.g. one in each corner). The object is maintained at a desired position while the respective fastening devices are tightened.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A fastening device for joining a first object to a second object including an aperture at a predetermined distance from each other, said fastening device comprising a sleeve member adapted to be firmly affixed to said first object, a distance member movably disposed within said sleeve member whereby said distance member is adapted to abut against said second object, an expansion member adapted to bear against said distance member within said sleeve member, and a fastening screw for interacting with said aperture in said second object whereby when said fastening screw is tightened said expansion member is pressed against said distance member and is thereby expanded to lock against said sleeve member.

2. The fastening device of claim 1 wherein said sleeve member has an inner dimension and includes a bottom surface defining an aperture having an inner dimension, and said distance member comprises a flange having an outer dimension, said outer dimension of said flange being greater than said inner dimension of said aperture in said bottom surface of said sleeve member and less than said inner dimension of said sleeve member.

3. The fastening device of claim 2 wherein said expansion member bears against said flange.

4. The fastening device of claim 1 including a planar washer disposed between said fastening screw and said expansion member.

5. The fastening device of claim 1 wherein said expansion member has a circumference and comprises a plurality of radial tongues extending towards said circumference, said plurality of radial tongues being curved in relation to the plane of said expansion member.

6. The fastening device of claim 1 including a transport securing device fixed on said distance member and interacting with said fastening screw.

7. A vehicle seat comprising a fastening device according to claim 1.

* * * * *